May 17, 1949.　　　　N. DESJARDINS　　　　2,470,548
AUTOMATIC EGG BOILER
Filed Feb. 14, 1945　　　　　　　　　　3 Sheets-Sheet 1
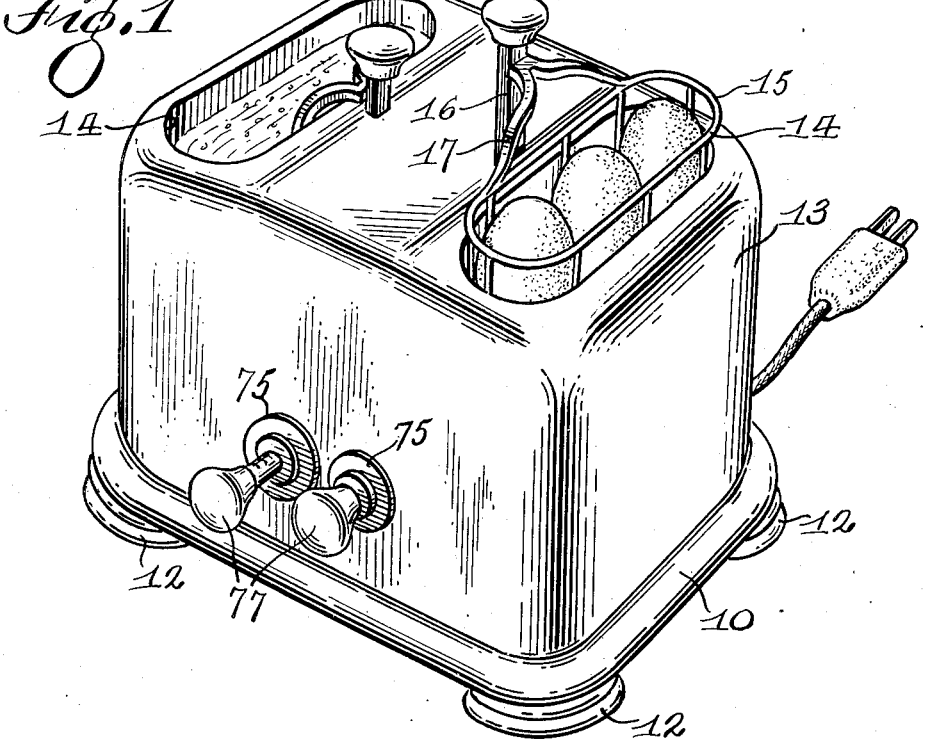
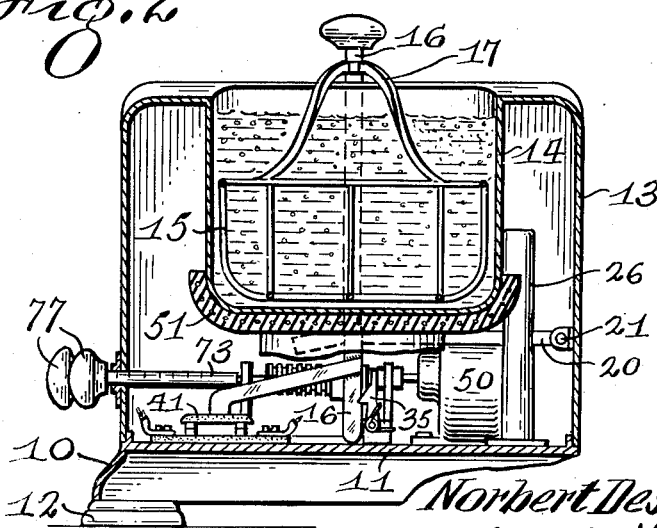
Inventor
Norbert Desjardins
By Robie H. Hastie
Attorneys May 17, 1949.　　　　N. DESJARDINS　　　2,470,548
AUTOMATIC EGG BOILER Filed Feb. 14, 1945　　　　　　　　　　3 Sheets-Sheet 2

Inventor
Norbert Desjardins
By Robie Hastie
Attorneys

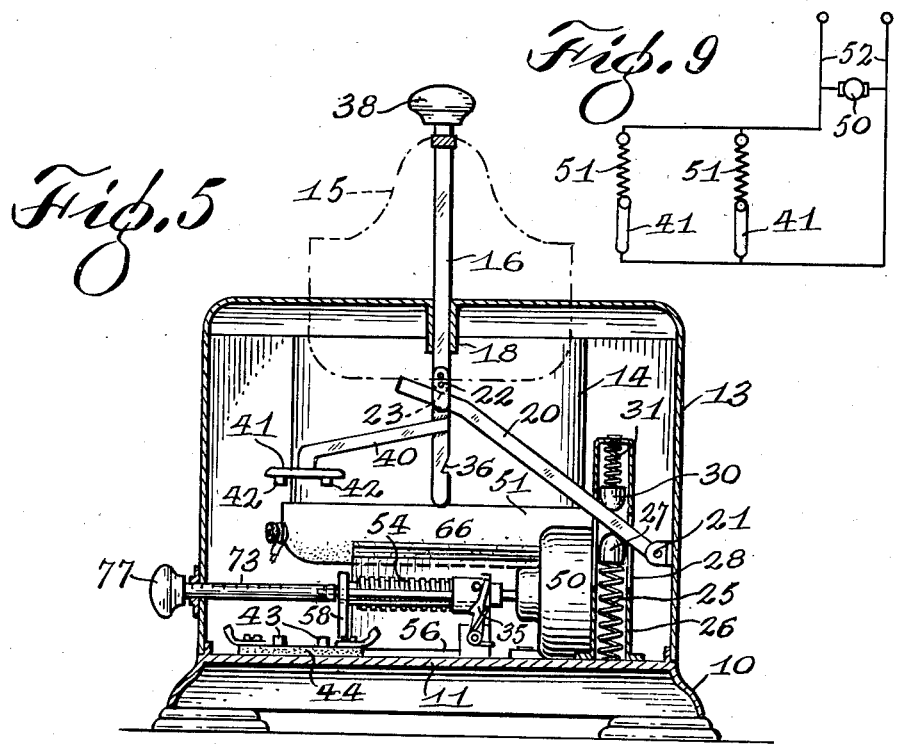
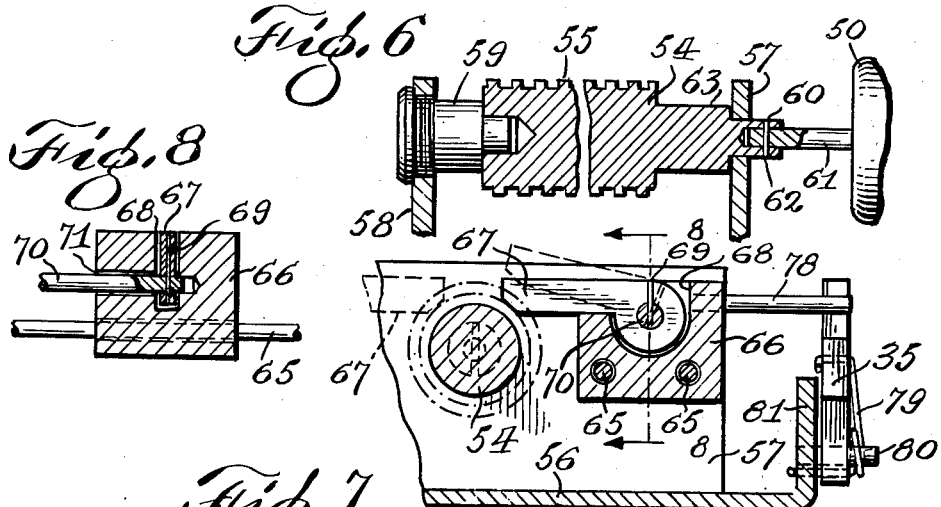

Patented May 17, 1949

2,470,548

UNITED STATES PATENT OFFICE 2,470,548

AUTOMATIC EGG BOILER

Norbert Desjardins, Montreal, Quebec, Canada

Application February 14, 1945, Serial No. 577,767

3 Claims. (Cl. 99—336)

The present invention relates to a time-controlled mechanism and, more particularly, one for boiling eggs a predetermined period of time before automatic removal from the boiling medium.

The main object of the invention resides in the provision of means of the character described so designed as to be assembled into a compact and efficient unit for portable table use.

An important object, also, is the provision of an automatic electric egg boiler embodying, within a small portable enclosure, a simple and rugged mechanism for boiling eggs in an economical manner.

A further object concerns an egg boiler of the character described, having automatic means for boiling eggs for two separately selectable and adjustable periods of time.

Another object envisages a table egg boiler provided with means for reducing to a minimum the time required for bringing the boiling water to the boiling point.

A still further object contemplates an egg boiler which can be produced inexpensively and out of readily procurable materials.

Still another object relates to an egg boiler of portable character embodying a timing mechanism of simple and foolproof character adaptable to operate in a selectively independent manner a pair of cages for raising eggs out of the boiling medium.

Other objects and advantages of the invention will become apparent as the description progresses.

As an example and for purposes of illustration only, an embodiment of the invention is shown in the annexed drawings wherein:

Figure 1 is a perspective view of the egg boiler according to the invention,

Figure 2 is a transverse vertical section taken through one unit of the boiler,

Figure 3:
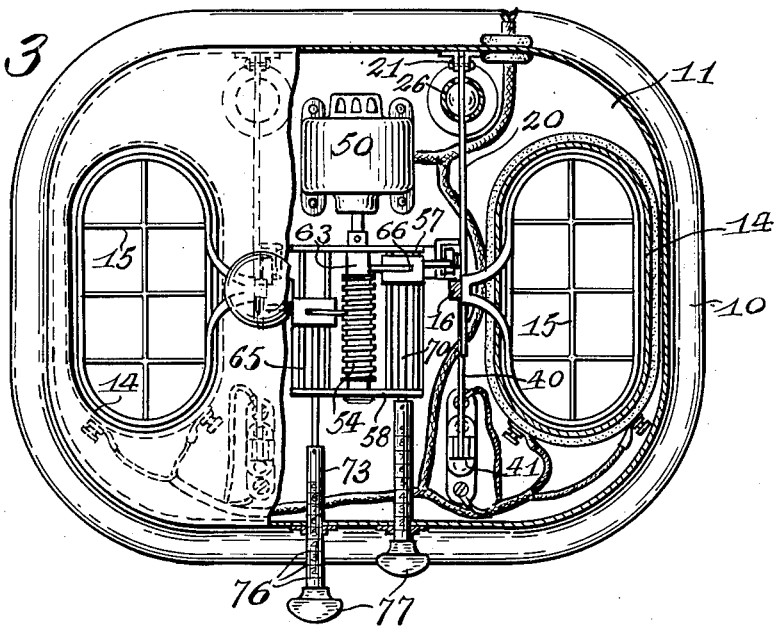
Figure 4:
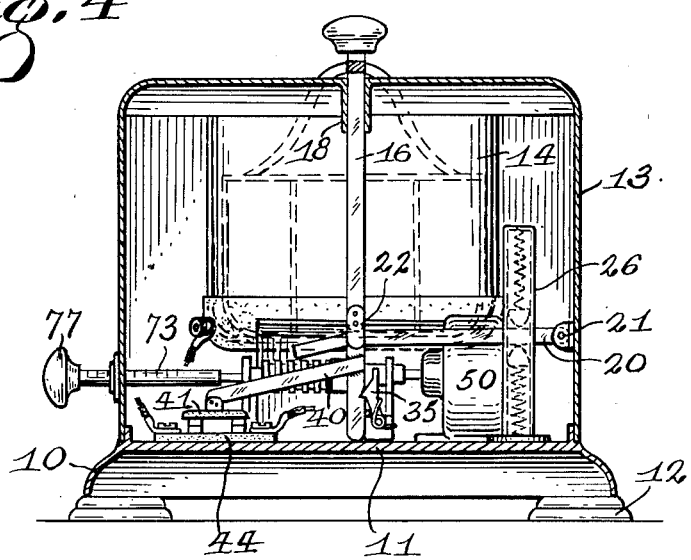

Figure 3 is a plan view of said boiler with a portion of the casing removed to shown the interior, Figure 4 is a transverse vertical section similar to Figure 2 but taken through the middle of said boiler, Figure 5 is a view similar to Figure 4 showing the boiler in inoperative position, Figure 6 is a longitudinal vertical section through the timing screw, Figure 7 is a section taken at right angles to the axis of the timing screw through the movable timing clock, Figure 8 is section taken on the line 8—8 of Figure 7, and Figure 9 is a diagram of the electrical connection of the boiler.

Referring to the drawings, wherein similar reference characters represent corresponding parts throughout, the numeral 10 indicates the base of the apparatus, which base is in the form of a metal stamping having a platform 11 and decorative corner legs 12. As shown in Figures 2, 4 and 5, the base is adapted to receive an outer rectangular casing 13, which casing is meant to enclose the operating mechanism of the boiler and to support a pair of water wells 14 formed therein at both ends thereof, each of said wells forming part of an independent boiling unit, so that two individual egg lots can be boiled for different times, independently of each other.

Each of the wells described above is adapted to receive a small quantity of water and in which the eggs to be boiled are immersed. The means for holding the eggs in said water and retracting the same automatically, after a given boiling time, consist of a basket 15 formed of wire and the like, and which is of a size sufficient to hold three normal size eggs. Said basket is supported on a vertical movable post 16 by means of a suitable bracket 17 securing said basket to the upper end of the post. As shown to advantage in Figures 4 and 5, the post 16 is slidably supported within a bushing 18 integrally formed with the top of the casing 13 adjacent the inner side of each well. Thus, the basket may be lowered in the water or raised therefrom, according to the longitudinal movement imparted to the said post 16.

Each of the said posts 16 is of a length sufficient to reach the platform or base plate 11 whenever the basket attached thereto is lowered into its corresponding well just short of the bottom thereof. The posts 16 are normally urged upwardly by a lever 20, the outer end of which is pivoted to the casing at 21 and the inner end of which engages a clip 22 riveted or otherwise secured to an intermediate point of the shaft and disposed under the lug 23 of said clip which straddles the outer end of the lever. A spring 25, enclosed within a tubular casing 26 supported on the base plate, operates to act on the outer end of the lever 20 through the intermediary of a piston 27 slidable longitudinally within the housing 26 and disposed to act under the lever 20 to urge the same upwardly. As shown in Figures 2, 4 and 5, the lever 20 extends through the middle of the housing 26, through diametrically aligned slots or apertures 28. The outward movement of the lever 20, under the action of the spring 25, is dampened by means of a piston 30 slidably disposed within the upper part of the housing 26 and urged downwardly by means of a spring 31. Thus, said piston acts as a dash pot to retard the upward movement of the lever by means of the air compressed therebehind and escaping between said piston and housing.

Inasmuch as the posts 16 are, at all times, urged upwardly, means are provided to hold the same in downward position, said means including a latch 35 adapted to engage a notch 36 formed in the lower portion of each post 16. Consequently, the post and attached basket can be held downwardly by the latch when depressed sufficiently by pressing on the knob 38 surmounting the upper end of the post. Since the latch 35 forms part of a mechanism to be described fully later on, further reference will be made thereto when said mechanism is disclosed. Each of the posts 16 is provided with an arm 40, the outer end of which carries an insulated plate 41 supporting electric contacts 42 connected electrically together; the purpose of those contacts is to bridge similar contacts 43 supported by an insulating member 44 disposed on the base plate 11, the contacts 43 being electrically connected in an electric circuit to be described further on.

This electric circuit includes a synchronous electric motor 50 and a pair of electric heating elements 51, each of said elements being associated with the bottom of one well 14 for the purpose of heating to the boiling point the quantity of water in said well. The position of the heating elements is shown in Figures 2, 4 and 5, and the connections thereof in Fig. 9, wherein it will be seen that the motor 50 is connected in parallel with the power line 52 as well as the heaters 51 which, however, can be placed in and out of circuit by the switching member 41.

The mechanism described so far is operable to lower a number of eggs into a boiling medium and to connect to an electric current source a heater capable of bringing said medium to the boiling point. The egg retaining means are held in lowered position by means of a latch and will continue to be so held until the said latch has been tripped. Automatic means for tripping the latch after a certain time has elapsed is embodied in the egg boiler of the invention and is shown more particularly in Figures 3, 5, 6, 7 and 8.

The actuating means for the timing device consist of the synchronous motor 50 already described and which is designed to revolve very slowly such as, for example, one revolution per minute. The said motor is connected to and actuates a lead screw 54 having rather coarse threads 55 and which screw is rotatably supported in a frame embodying a base 56, a back vertical wall 57 and a front wall 58; the screw is more particularly journaled between said walls in an aperture of wall 57 and to the end of a threaded stud 59 threadedly secured to the front wall 58 (see Fig. 6). The screw is connected to the motor 50, as previously disclosed, and the connection may include an extension 60 of the screw engaging the shaft 61 of the motor and pinned thereto at 62. Thus, the screw is adapted to revolve in unison with the motor and at the speed thereof.

On each side of the lead screw, and parallel to the longitudinal axis thereof, a pair of parallel rods 65 are disposed between the walls 57 and 58, which rods provide a support for an apertured block 66 in which the rods 65 are disposed and which block is accordingly slidable thereover, longitudinally of the screw and parallel therewith.

Each of the blocks 66 carries an arm 67 which is disposed in a slot 68 of the block and extends outwardly therefrom so that the end thereof is adapted to engage one thread of the lead screw 54. The said arm is secured by a pin 69 to a shaft 70 inserted in a bore 71 of the slot above and parallel to the support rods 65. Each of the shafts 70 is connected at its outer end with a larger tubular indicating member 73, which is meant to extend out of the casing through suitable bushings 75 and which member carries suitable indications 76 corresponding to the boiling time in minutes. For manipulating purposes, the end of said member is provided with an operating knob or handle 77. Finally, each block 66 is provided with an extension pin 78 projecting from the outer side of the block and adapted to engage the upper end of the latch 35 for tripping said latch against the action of a spring 79 urging the said latch into engaging position with the notch 36 of the post 16. As shown to advantage in Figure 7, the latch 35 is pivoted to a pin 80 which in turn is secured to an upturned extension 81 of the frame base 56.

From the foregoing description, it will be evident that whenever the lead screw 54 is rotated by the motor 50, the block 66 on each side thereof will be longitudinally moved as the end of the lever 67 is displaced longitudinally by the action of the screw threads. Consequently, the latch 35 will be disengaged from the notch 36 by the pin 78 whenever said lever 67 has reached its extreme end position on the screw, just before being disengaged therefrom onto the smooth reduced shoulder 63, where it remains until manually re-engaged with the screw for another timing operation (see Fig. 3). Therefore, the time required for a lever 67 to travel from one end of the lead screw to the other is a very definite interval which is a function of the thread size and speed of the motor.

In order to vary at will this interval of time, the lever can be lifted from engagement with the screw by turning the knob 77 slightly so as to actuate the lever out of engagement with the screw, sliding the block longitudinally over the rod 65 and replacing the same in engagement with the proper thread according to the indication marked on the stem of the member 73. Thus, after this interval of time has elapsed, the latch 35 will be tripped and the post 16 allowed to move upwardly, thereby raising out of the boiling medium the eggs disposed in the basket 15. In other words, the closer to the wall 57 the lever 67 is engaged with the screw thread, the shorter will be the time required to trip the latch.

In operation, a quantity of water determined by experiment is disposed in each of the wells 14 and up to three eggs inserted in the basket 15. The posts 16 are then pushed down and latched, which motion will immediately cause the heating action of the element 51, whereby the water will be brought to a boil. Thereafter, each knob 77 can be manipulated according to the indication on the stem 73, so as to cause raising of the corresponding basket at the end of the time chosen and indicated on said stem 73. Of course, since the water in the well is not brought instantaneously to the boiling point, it might be necessary to compensate slightly for this delay by increasing the time that the eggs are left in the well.

At any event, due to the very small quantity of liquid needed, this time is rather short and, in most cases, can be disregarded.

From the foregoing description, it should be evident that the present invention is a most useful advance of the art, in that it enables the boiling of eggs for predetermined times in a very simple and foolproof manner by means of a mechanism which is rugged and extremely simple. Furthermore, due to the specific construction and characteristics of the invention, the said boiler is readily portable and may be disposed on the breakfast or dinner table as readily as the common electric toaster, percolator, hot plate or the like.

It must be understood that various changes as to the shape, size and arrangement of parts may be resorted to without departing from the spirit of the invention or the scope of the subjoined claims.

Having thus described my invention, I claim:

1. A portable, automatic egg-boiler comprising, in combination, a water well, means for heating the water, an egg-holding basket lowerable into the water, a spring urging said basket upward and a latch for retaining said basket in lowered position, a threaded lead screw constantly rotated and held against longitudinal movement, a block slidable parallel to said screw and adapted to trip the latch, an extension arm pivoted to said block and engageable with the screw threads so as to be propelled by the screw, and means for selectively engaging the arm with the screw at preselected points therealong corresponding to time intervals required by the block to reach the latch tripping position, said screw being unthreaded at this position.

2. A portable automatic egg-boiler comprising, in combination, a pair of water wells and a pair of egg-holding baskets immersible therein, means for heating the water in the wells, springs adapted to urge each of said baskets independently out of said wells and latches adapted to hold same in immersed position, a threaded lead screw constantly rotated between said wells and held against longitudinal movement, a pair of blocks slidable parallel to the screw adjacent each side thereof, and each adapted to trip one of said latches, an arm pivoted to each block engageable with the screw threads on one side of the latter and adapted to be longitudinally displaced thereby, and means for selectively engaging each of said arms independently with the screw at preselected points therealong corresponding to the time intervals required by the blocks to reach latch-tripping position, said screw being unthreaded at this position.

3. In an egg-boiler as claimed in claim 2, said arm-engaging means comprising a rotatable and longitudinally slidable rod adapted to pivot with said arm and slide with said block.

NORBERT DESJARDINS.

REFERENCES CITED

The following references are of record in the file of this patent:

UNITED STATES PATENTS

| Number | Name | Date |
|---|---|---|
| 1,091,486 | Cutler | Mar. 31, 1914 |
| 1,167,947 | Spitz et al. | Jan. 11, 1916 |
| 1,977,454 | Price | Oct. 16, 1934 |
| 2,359,580 | Poole | Oct. 3, 1944 |
| 2,372,978 | Pelenberg | Apr. 3, 1945 |